3,442,878
**NEUTRALIZATION OF IMPURITIES IN
ISOPRENE POLYMERIZATION**
Morris Gippin, Fairlawn Village, Ohio, assignor to The
Firestone Tire & Rubber Company, Akron, Ohio, a corporation of Ohio
No Drawing. Filed Feb. 15, 1967, Ser. No. 616,184
Int. Cl. C08d 1/14
U.S. Cl. 260—82.1                                     6 Claims

---

ABSTRACT OF THE DISCLOSURE

Isoprene and/or the hydrocarbon solvent destined for polymerization process using a trihydrocarbon aluminum/titanium tetrachloride catalyst is treated with a dihydrocarbon aluminum chloride to destroy impurities. The yield of polymer, reproducibility of results and rate of reaction are greatly increased, and the control of the process is non-critical, since the process will tolerate substantial excess of dihydrocarbon aluminum halides.

---

BACKGROUND OF THE INVENTION

Isoprene and hydrocarbon solvents commercially available contain impurities which, even in trace amounts, severely affect the trihydrocarbon aluminum/titanium tetrachloride coordination-type catalysts used to polymerize isoprene. It has heretofore been proposed to destroy these trace impurities by preliminarily contacting the isoprene and/or solvent with one or the other or both of the catalyst components (trihydrocarbon aluminum or titanium tetrachloride, see British Patents 815,310, 870,010, 872,283, 916,132, 920,512, 920,513, 997,830 and 1,009,285 and Belgian 544,829); however this has proven unsatisfactory, as the catalyst, when it operates on isoprene, is extremely sensitive to departures from the optimum ratio of trialkyl aluminum to titanium tetrachloride, so that any excess reagent added for insurance or in consequence of inaccurate analysis or control, upsets the catalyst and greatly lowers the yield. The sensitivity of these catalysts to the aluminum:titanium ratio will be seen from the following tabulation:

Table I

| Al/Ti ratio: | Conversion percent |
|---|---|
| 1.10 | 55 |
| 1.05 | 84 |
| .95 | 90 |
| .90 | 54 |

SYNOPSIS OF THE INVENTION

The disadvantages of the prior art are remedied, in accordance with this invention, by treating the isoprene and/or solvent, not with a constituent of the catalyst, or with the preformed catalyst, but rather with a dihydrocarbon aluminum chloride. It will be appreciated that dihydrocarbon aluminum chlorides are unsatisfactory as practical or effective components of coordination catalysts with titanium tetrachloride for the polymerization of isoprene; a mixture of a dihydrocarbon aluminum and titanium tetrachloride will at best polymerize isoprene at a slow reaction rate and with poor yields, and the products will have poor microstructure and will be contaminated with non-linear, cyclized polymers. This is, of course, not to controvert the fact that dihydrocarbon aluminum halide/titanium tetrachloride catalysts are eminently satisfactory catalysts for the polymerization of alpha-monoolefins such as ethylene, propylene, etc. In the practice of this invention, the dihydrocarbon aluminum chloride quickly reacts with and destroys the impurities in the isoprene and/or solvent, so that excellent yields are obtained in the polymerization operation. However, the dihydrocarbon aluminum chloride, not being a constituent of the catalysts, does not enter thereinto and does not upset the aluminum/titanium ratio therein. It is, therefore, unnecessary to exercise extremely careful control of the amount of dihydrocarbon aluminum chloride added in accordance with this invention; indeed it may be desirable to add a definite excess in order to insure against errors or to effect rapid and complete destruction of the impurities. In general, with feedstocks in which the gross impurities, particularly water, have been reduced to low levels, as by distillation, treatment with calcium hydride and/or passage over surface-active materials, it will be desirable to employ 0.1 to 10.0, and preferably 0.1 to 2.5 mols of the dialkyl aluminum chloride per mol of trihydrocarbylaluminum in the catalyst ultimately employed. In the case of streams free from gross impurities, this will generally provide a sufficient excess to insure against errors in dosage and to effect rapid destruction of impurities. In the case of feedstocks containing grosser amounts of impurities, the quantity of dihydrocarbon aluminum chloride will be increased by an amount found by titration necessary to destroy the gross impurities as described below. Indeed the amount of dihydrocarbon aluminum chloride used is not critical, so long as some excess is supplied above that required to destroy the impurities; when the excess is greater than 2.5 mols per mol of titanium tetrachloride, some deterioration of yield may be observed, but this is gradual rather than abrupt. Isoprene, solvents and/or solutions of isoprene and solvents purified in this monomer perform well in the known polymerization processes employing trihydrocarbon aluminum/titanium chloride catalysts, giving excellent yields of high-quality polyisoprene.

THE DIHYDROCARBON ALUMINUM CHLORIDES

The dihydrocarbon aluminum chlorides used in the practice of this invention may be any such compounds in which the hydrocarbon groups individually contain from 1 to 12 carbon atoms such as alkyl and cycloalkyl groups on the order of methyl, ethyl, propyl, isopropyl, butyl, n-hexyl, 2-ethylhexyl, decyl, dodecyl, cyclohexyl, decahydronaphthyl and the like, and aromatic hydrocarbon groups such as phenyl, the several tolyl groups, alpha- and beta-naphthyl, and aralkyl groups such as benzyl and various alkylated benzyl groups. It will be understood that the two hydrocarbon groups in the dihydrocarbon aluminum chloride need not be the same. Exemplary specific compounds are dimethyl aluminum chloride (the preferred, diethyl aluminum chloride, diisopropyl aluminum chloride, di-n-butyl aluminum chloride, diphenyl aluminum chloride, di(2-ethylhexyl) aluminum chloride, dibenzyl aluminum chloride, didodecyl aluminum chloride, methyl ethyl aluminum chloride and the like. It will be understood that mixtures of dihydrocarbon aluminum compounds above indicated as being suitable may also be employed.

THE FEEDSTOCKS TREATED IN ACCORDANCE WITH THIS INVENTION

These include the isoprene itself and/or the hydrocarbon solvents to be used in the polymerization. These are available in a wide range of purities, and while theoretically even the most impure stocks might be treated in accordance with this invention by the use of a sufficient excess of the dihydrocarbon aluminum chloride, it will be appreciated that the gross impurities, including water, may be removed more economically by distillation, contacting with calcium hydride, passage through molecular sieves or other adsorbent materials, and other well-known treatments. Hydrocarbon solvents which may be purified in accordance with the invention include for instance paraffin hydrocarbons such as propane, butane, hexane, heptane, petroleum ether and other petroleum fractions, coal hydrogenation oils, benzene, toluene and the various xylenes, hydrogenated aromatics and the like. In some cases it may be desired to carry out the polymerization of isoprene in a mixture with extender oils, and any such extender oils may be purified in accordance with this invention. Likewise the isoprene may be obtained as a cut from a refinery stream containing isoprene along with various other hydrocarbons such as butane, hexane, and the like. The harmful impurities in such mixtures may be inactivated in accordance with this invention and the stream may be forwarded to the polymerization reaction, the hydrocarbons other than isoprene and relatively inert with respect to the catalyst providing a greater or lesser proportion of the solvent.

It will be appreciated that the process of this invention can also be applied to the polymerization of mixtures of isoprene with other unsaturated ethylenic compounds copolymerizable therewith such as styrene, alpha-methyl styrene, other conjugated diolefins such as butadiene, 2,3-dimethyl butadiene, nuclearly alkylated styrenes, and the like. These comonomers may be employed in amounts up to say 35%, or any other useful and practical proportion, based upon the total weight of comonomers and of isoprene in the mixture to be polymerized. It will be understood also that the addition of the dihydrocarbon aluminum chloride for purification purposes may be made to the isoprene, to the solvent to be used, to the comonomers or to any mixture of these in order to purify the same before entry into the polymerization reaction proper. It will be understood that either or both of the isoprene and solvent may be individually and separately purified in accordance with this invention, or a solution of the isoprene in a solvent may be purified.

As noted above, the feedstocks to be treated according to this invention are supplied in various degrees of purity. In those cases where initial drying has been carried out, as for instance by contacting with calcium hydride, it may be assumed that only traces of water are present, and preliminary purification effected by distillation and/or passage through adsorbent materials, etc., analysis will be unnecessary and small amounts, for instance in the range of 0.2 to 2.5 mols, of dihydrocarbon aluminum chloride per mol of trihydrocarbylaluminum in the catalyst ultimately used may be added. In those cases where grosser amounts of impurities are present, an aliquot of the material may be titrated with a dihydrocarbon aluminum chloride, using a trace of titanium tetrachloride as an indicator. Appearance of a light yellowish or brown coloration may be taken as the end-point, and indicates destruction of the impurities and the presence of a slight excess of dihydrocarbon aluminum chloride; and a scaled-up proportional amount added to the main body should suffice to destroy all impurities therein. It will often be desirable for prudential reasons, to add further quantities of dihydrocarbon aluminum chloride, for instance in the range of 0.1 to 2.5 mols per mol of trihydrocarbylaluminum in the catalysts to be used.

It will be appreciated that the purification operation of this invention may be carried out for either batchwise polymerizations, in which case a body of the solvent and/or isoprene to be treated is loaded into a suitable vessel, and the required quantity of dialkyl aluminum chloride dispersed therein by agitation; or for continuous polymerization, in which case a stream of the material to be treated is passed continuously through a conduit, mixing vessel or other equipment, and the dialkyl aluminum chloride continuously metered into the stream at a rate appropriately proportioned to the flow of such stream.

THE CATALYTIC POLYMERIZATION

The catalytic polymerization reactions for which monomers and/or solvents are purified in accordance with this invention are known per se, and involve contacting the purified isoprene and/or solvent with a catalyst comprising a trihydrocarbon aluminum plus titanium tetrachloride wherein the aluminum: titanium ratio is in the range of approximately 0.9–1.1 and preferably 0.95–1.05. This invention also applies to the purification of isoprene and/or solvents to be used with trihydrocarbon aluminum/titanium tetrachloride catalysts which have been modified by addition of ethers such as diphenyl ether, or other adjuvants. As appears above in Table I, the efficiency of these catalysts is extremely sensitive to this ratio, and the great merit of this invention lies in the fact that this ratio may be completely controlled by simply supplying the trihydrocarbon aluminum and titanium tetrachloride in the correct ratios; no allowance has to be made for impurities, as these are efficiently scavenged by the dihydrocarbon aluminum halide used in the purification of this invention. On the other hand, the dihydrocarbon aluminum halide, not being an effective constituent of these catalysts, does not upset this ratio, even though it may have been supplied (either accidentally, or by way of insurance) in excess of the amount stoichiometrically required to destroy the impurities. Reverting to the catalyst proper, trihydrocarbon aluminum compounds suitable as catalyst components include any compound in which aluminum is bound to three hydrocarbon groups each of which contains from 1 to 12 carbon atoms, such as trialkyl aluminums on the order of trimethyl aluminum, triethyl aluminum, tri-n-propyl aluminum, tri-n-butyl aluminum, triisobutyl aluminum, tri-(2-ethyl hexyl) aluminum, tri-(dodecyl)aluminum and the like, triaryl aluminums such as triphenyl aluminum, the several tritolyl aluminums, tri-beta-naphthyl aluminum, and the like. It will be understood that these compounds may be used singly or in any admixture of two or more of the compounds above indicated as being suitable.

Having the foregoing general discussion in mind, there are given herewith detailed examples of the practice of this invention. All parts and percentages are given by weight.

Example I

A. PREPARATION OF CATALYST

| | Ml. |
|---|---|
| Hexane | 805 |
| Titanium tetrachloride solution (1 molar, in hexane) | 100 |
| Triisobutyl aluminum solution (1 molar, in hexane) | 95 |

The above recipe provides an Al/Ti ratio of .95:1.00. The ingredients were charged into a dry 7-ounce beverage bottle and quickly mixed while flushing with nitrogen, and the bottle then sealed with a crown cap provided with a nitrile rubber liner and a perforation for hypodermic withdrawal of contents. The order of charging was as listed in the recipe, which is the preferred order, but may be reversed, provided the mixing is done rapidly. The bottle was shaken to mix the ingredients and used approximately one hour later in the polymerization described below. This time period is not critical, as the catalyst is good for an extended period of time after preparation.

B. FIRST PURIFICATION OF SOLVENT

The hexane used in the experiments under (D) below was purified by washing with successive portions of concentrated sulfuric acid until the washings were water clear, then with distilled water, and thereafter with 5% aqueous potassium hydroxide. The hexane was then washed with successive portions of distilled water until the washings were neutral and then dried over calcium hydride. The dried hexane was then distilled, discarding a 10% forerun and a 30% residue (percentages are by volume). The distillate not discarded was passed through a silica gel column and stored over calcium hydride until use.

C. FIRST PURIFICATION OF ISOPRENE

In a control polymerization experiment for comparison with diethylaluminum chloride purification, the isoprene was refluxed over sodium for one hour, and then distilled, a forerun of 10% by volume being discarded, and a principal cut of about 70% by volume being collected in a sufficient amount of hexane (purified as described at B and still containing calcium hydride) to provide a 10% by weight solution of isoprene in hexane. The solution of isoprene in hexane was let stand for 18 hours in contact with the calcium hydride entrained with the hexane, and then transferred through a dry glass wool filter plug (to retain the calcium hydride) into a carefully dried polymerization bottle.

For all other experiments solutions of isoprene in hexane were prepared exactly as just described, except that the initial refluxing of the isoprene with sodium was omitted.

D. POLYMERIZATION

Isoprene solution (10% by weight
 in hexane, prepared per C above,
 purification per Table I) _____ 500 g.
Diethyl Aluminum Chloride solu-
 tion (1 molar, in hexane) ____ 0–2.5 ml. (0.0–5.0 millimols per 100 grams of isoprene, as per Table II).
Catalyst solution (prepared per A
 above) _____ 15.0 ml. (1.425 millimols Al) (1.5 millimols Ti).

A series of runs was made in accordance with the above recipe, the details of the individual runs (use-or-not of sodium-refluxed hexane; amounts of diethyl aluminum chloride) being set forth in Table II. In each run, the isoprene solution was charged into a beverage bottle while purging the bottle with nitrogen. Thereafter diethyl aluminum chloride, in the amount selected for the run, was added, the bottle swirled to insure mixing, and placed in the polymerization wheel at 5° C. for 2 hours in order to prechill the charge. Thereafter the catalyst was transferred to the bottle by means of a hypodermic syringe, and the bottle sealed with a nitrile-rubber-lined crown cap. The bottle was then placed upon the polymerizer wheel which dipped and revolved in a bath at 5° C. for 24 hours. At the end of this time, the bottle was cut open and the contents dumped into a body of isopropanol containing 0.005 part of Eastozone 31 (N,N'-di-(1-ethyl-3-methyl pentyl)-p-phenylenediamine) and 0.2 part of di-tertiary-butyl para-cresol per 100 parts of rubber. The coagulated polymer was dried at 50° C. in a vacuum oven. Set forth herewith in Table II are the particulars of the several runs.

TABLE II

| Run No. | Diethyl aluminum chloride used (per 100 grams isoprene) (mmols) | Conversion | Cis-1,4 content of polymer | DSV |
|---|---|---|---|---|
| 1 | 0.00 [1] | 72.7 | 97.0 | 3.3 |
| 2 | 0.00 | 39.9 | 96.7 | 3.6 |
| 3 | 1.00 | 71.7 | 97.0 | 3.1 |
| 4 | 2.85 | 95.7 | 96.7 | 3.4 |
| 5 | 4.00 | 64.8 | | |
| 6 | 5.00 | 44.7 | 96.8 | 3.7 |

[1] In this run, the isoprene had been refluxed with sodium per the procedure at "C" above. In all other runs, the preliminary sodium refluxing was omitted.
[2] "DSV" signifies "dilute solution viscosity."

From the table it will be evident that the treatment of the solvent and monomer with diethyl aluminum chloride (Runs 3–6) greatly increased the yield (conversion) obtained from the catalyst as compared to the runs without diethyl aluminum chloride treatment of Run No. 2. In the optimum ranges (Runs 3–4) the results are comparable or superior to the sodium cleanup of Run No. 1, heretofore regarded as an effective but cumbersome method. It will be appreciated that the molecular proportions of diethyl aluminum chloride used are relatively gross (up to 5 millimols per 3 millimols of titanium in the catalyst) in the context of this type of reaction—i.e., accurate dosage not critical. Attempts to use corresponding quantities of trialkyl aluminum, such as the triisobutyl aluminum component of the catalyst, would completely upset the balance of the catalyst in its operation with isoprene, and would result in negligible yields, see Table I above.

Example II.—Large scale preparation

A. PREPARATION OF CATALYST

Hexane _____ 500 ml.
Triisobutyl aluminum
 (20% in hexane) _____ 84.7 (58.1 mmols).
Titanium chloride
 (36.2% in hexane) ____ 18.5 ml. (61.25 mmols).

Ten bottles of catalyst were made up, each according to the above recipe. In each case a bake-dried 28-ounce beverage bottle was cooled under nitrogen, and while flushing, the above ingredients were rapidly added in the listed order. The bottles were sealed with a crown cap having a nitrile rubber liner and a perforation for hypodermic transfer of the contents. The molar ratio of the triisobutyl aluminum to titanium tetrachloride is 0.95 to 1.00. The catalyst was aged for one hour before being used in the polymerization described below.

B. PURIFICATION OF FEEDSTOCK

Isoprene solution (10% by weight in hexane) __lbs__ 90
Diethyl aluminum chloride solution (20% by weight
 in hexane) _____ml__ 0 or 1052

A 20-gallon stainless steel pressure reactor provided with a temperature-control jacket and anchor stirrer was used in these several runs. The operations below were carried out at 41° F. The isoprene solution, which had been dried to 5 p.p.m. or less moisture content by circulation through a 3 A. molecular sieve column, was charged into the reactor, followed by diethyl aluminum chloride solution, or in the absence of such solution, as set forth in Table III. The reaction contents were agitated during a pre-chilling period of about two hours prior to the addition of the catalyst.

C. POLYMERIZATION

When the isoprene solution, with or without the diethyl aluminum, reached the temperature of 41° F., the contents of two bottles of the above-described catalyst were added. For double the catalyst level, the contents of four bottles were charged.

Polymerization set in immediately, and the temperature was maintained at 41° F. as nearly as possible. At the end of 24 hours, the charge was dropped into 15 gallons of isopropanol containing dissolved therein 100 ml. of triethylamine, 135 g. of di-tertiary-butyl para-cresol and 3.3 g. of N,N'-di-(1-ethyl-3-methylpentyl)-para-phenylenediamine. Two-thirds of the charge was dropped first and coagulated with agitation, after which the remainder was similarly dropped and coagulated. The resultant crumb was dried in an oven at 125° F. for 24 hours.

The following results were obtained:

TABLE III.—PER HUNDRED GRAMS OF ISOPRENE

| Run no. | Millimols Et$_2$AlCl | Millimols i-Bu$_3$Al | Millimols TiCl$_4$ | Time, hours | Percent conv. |
|---|---|---|---|---|---|
| 1 | 0 | 2.85 | 3.0 | 14 | 0 |
| 2 | 0 | *5.79 | *6.0 | 24 | 28 |
| 3 | 3.0 | 2.85 | 3.0 | 17 | 78 |
| 4 | 3.0 | 2.85 | 3.0 | 20 | 70 |

*Excess catalyst used for elimination of impurities resulted in Al/Ti imbalance, with considerable impairment of catalyst efficiency.

Example III.—Determination of Et$_2$AlCl demand

In carrying out the process of Example II, starting with the blend dried over the molecular sieve, 350 ml. of the diethyl aluminum chloride solution is added to the charge in the 20-gallon reactor and stirring is continued for ½ hour. At the end of this time, 200 ml. of the reactor charge is withdrawn under nitrogen into a clean, dry 28-ounce bottle and capped. One ml. of 1.0 molar $TiCl_4$ solution is injected into the bottle and the contents allowed to stand for 15 minutes. If no yellow or brown color develops at the end of this time, one ml. of the $Et_2AlCl$ solution is added. The procedure is repeated until a light brown color develops. From the total amount of $Et_2AlCl$ added to the test sample, the amount required for the blend charge in the reactor is calculated and added. About 20 ml. of the molar diethyl aluminum chloride solution is added in excess to the total required. In Runs Nos. 3 and 4 of Table III, the indicated diethyl aluminum chloride demand was 3.00 millimol per 100 grams of isoprene.

Example IV.—Large scale preparation—ether-containing catalysts

A. PREPARATION OF CATALYST

| | |
|---|---|
| Hexane _____lbs__ | 40 |
| Titanium tetrachloride _____grams__ | 647 |
| Triisobutyl aluminum solution (20% by weight, in hexane) _____lbs__ | 7.08 |
| Diphenyl ether _____grams__ | 92 |

The hexane, followed by the titanium tetrachloride was charged into a closed reactor vessel provided with an agitator. Thereafter the triisobutyl aluminum and diphenyl ether were loaded into a bomb and swirled together to mix the same. Five minutes thereafter the contents of the bomb were charged into the mixture contained in the reactor, and the entire contents agitated to effect complete mixing. This preparation was completed one hour before charging into the polymerization reaction described below.

B. PURIFICATION OF FEEDSTOCKS

| | |
|---|---|
| Isoprene solution (10%, by weight in hexane) _____lbs__ | 2500 |
| Diethyl aluminum chloride solution (20%, by weight in hexane) _____ml__ | 2910 |

A closed reactor provided with temperature control jacket and an anchor stirrer was employed in this operation. The above ingredients were charged into this reactor, the isoprene solution first having been dried to below 5 p.p.m. moisture content by circulation through a molecular sieve column. The reactor contents were agitated together for about 2 hours at 50° F. prior to polymerization as described below.

C. POLYMERIZATION

The contents of the reactor, purified as described above at B, were transferred to a polymerization reactor provided with a temperature control jacket and anchor stirrer, and the temperature adjusted to 30° F., this temperature being maintained as nearly as possible throughout the subsequent operations. The catalyst prepared as described at A above was then charged, and the polymerization carried out for 6 hours. At the end of this time the contents of the reactor showed a total solids content of 9.56%, indicating a conversion of 95.6% of the isoprene present.

The unreacted monomers were then vented, the reactor contents transferred to a closed agitating vessel, and 1.450 liters of methanol added to destroy the catalyst. The reaction mixture was then dropped into a coagulating bath of antioxidant-containing isopropanol of the same composition as used in Example II. The resultant crumb was dried in an oven at 125° F. for 24 hours, yielding a rubbery polyisoprene of high quality.

From the foregoing general discussion and detailed experimental examples, it will be seen that the present invention provides a simple and inexpensive means, free of any critical control problems, for the offsetting of impurities in isoprene and/or solvents therefor entering into polymerization reactions using coordination catalysts. The dialkyl aluminum chlorides used are inexpensive and free of the hazards associated with the alkali metals and the other more reactive materials heretofore used for this purpose.

What is claimed is:

1. Process for polymerizing isoprene or mixtures thereof with other ethylenically unsaturated compounds copolymerizable therewith, or solutions of isoprene or such mixtures in hydrocarbon solvents, characterized in that the impurities therein are destroyed by contacting the isoprene or solution is contacted with a dihydrocarbon aluminum halide before being contacted with a coordination-type catalyst comprising a trihydrocarbon aluminum plus titanium tetrachloride, plus optionally an ether, the mol ratio of trihydrocarbon aluminum to titanium tetrachloride in said coordination-type catalyst being from 0.95 to 1.05, and the dihydrocarbon aluminum halide being supplied in an amount sufficient to provide from 0.33 to 2.5 mols of dihydrocarbon aluminum per mol of trihydrocarbon aluminum in said coordination-type catalyst.

2. Process according to claim 1, wherein the dihydrocarbon aluminum chloride is diethyl aluminum chloride.

3. Process according to claim 1, wherein the diethyl aluminum chloride is employed to the extent of from 0.1 to 10 mols per mol of the trihydrocarbon aluminum in the catalysts.

4. Process according to claim 3, wherein the dihydrocarbon aluminum chloride is diethyl aluminum chloride.

5. Process according to claim 4, wherein the trihydrocarbon aluminum is triisobutyl aluminum.

6. Process according to claim 1, in which the ether is diphenyl ether.

References Cited

UNITED STATES PATENTS

| | | | |
|---|---|---|---|
| 2,910,461 | 10/1959 | Nowlin et al. | 260—94.9 |
| 3,058,963 | 10/1962 | Vandenberg | 260—88.2 |
| 3,066,123 | 11/1962 | Strohmayer et al. | 260—93.1 |
| 3,095,406 | 6/1963 | Short et al. | 260—94.3 |
| 3,197,453 | 7/1965 | Harban | 260—93.7 |
| 3,317,492 | 5/1967 | Hochwalt | 260—79.5 |

JOSEPH L. SCHOFER, Primary Examiner.

J. C. HAIGHT, Assistant Examiner.

U.S. Cl. X.R.

260—80.7, 83.7, 84.1 94.3

PO-1050
(5/69)

UNITED STATES PATENT OFFICE
CERTIFICATE OF CORRECTION

Patent No. 3,442,878      Dated May 6, 1969

Inventor(s) Morris Gippin

It is certified that error appears in the above-identified patent and that said Letters Patent are hereby corrected as shown below:

Column 2, line 51 should have parenthesis after "preferred";

Column 5, Table II, line 57, "DSV" should read --$DSV^2$--;

Column 6, Table III, line 67, under "Millimols 1-$Bu_3Al$", "5.79" should read --5.70--.

SIGNED AND
SEALED

AUG 26 1969